US012706868B2

(12) United States Patent
Huang

(10) Patent No.: US 12,706,868 B2
(45) Date of Patent: Aug. 11, 2026

(54) CREATING A DIGITAL ASSISTANT

(71) Applicant: Beijing Zitiao Network Technology Co., Ltd., Beijing (CN)

(72) Inventor: Xuneng Huang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 71 days.

(21) Appl. No.: 18/768,181

(22) Filed: Jul. 10, 2024

(65) Prior Publication Data

US 2025/0310282 A1 Oct. 2, 2025

(30) Foreign Application Priority Data

Mar. 29, 2024 (CN) ......................... 202410383220.0

(51) Int. Cl.
*H04L 51/02* (2022.01)
*G06F 3/0484* (2022.01)
*H04L 9/40* (2022.01)

(52) U.S. Cl.
CPC ............ *H04L 51/02* (2013.01); *G06F 3/0484* (2013.01); *H04L 63/08* (2013.01)

(58) Field of Classification Search
CPC ........ H04L 51/02; H04L 63/08; G06F 3/0484
See application file for complete search history.

(56) References Cited

U.S. PATENT DOCUMENTS 5,809,492 A * 9/1998 Murray .................. G06N 5/022 706/45
10,608,966 B1 3/2020 Landowski et al.
2019/0289010 A1* 9/2019 Yassour ................ H04L 67/125
2021/0034439 A1* 2/2021 Vaishnav ............ G06F 11/3688
2022/0075947 A1* 3/2022 Swvigaradoss ....... G06F 40/289
2023/0121261 A1 4/2023 Child et al.
2024/0073212 A1* 2/2024 Wu ..................... H04L 63/0884
2024/0176594 A1* 5/2024 Garnatz .................. G06F 40/20
2025/0131359 A1* 4/2025 Barrett .................... G06F 40/35

FOREIGN PATENT DOCUMENTS

CN 107438826 12/2017
CN 110785970 A 2/2020
CN 115037714 9/2022
CN 117632416 3/2024

OTHER PUBLICATIONS

International Search Report in International Appln. No. PCT/CN2024/138824, mailed on Mar. 10, 2025, 5 pages (with English translation).

* cited by examiner

*Primary Examiner* — Soe Hlaing
(74) *Attorney, Agent, or Firm* — Fish & Richardson P.C.

(57) ABSTRACT

According to embodiments of the disclosure, a method, an apparatus, a device, and a media for creating a digital assistant are provided. The method includes: presenting a settings region in a creation page of the digital assistant, wherein the settings region is configured to set a trigger of the digital assistant, the trigger specifying an event source for receiving a trigger event and an action corresponding to the trigger event, wherein the trigger event is an event from an application other than the digital assistant; in response to receiving a setting request for the settings region, setting the trigger based on the setting request; and creating the digital assistant based on the trigger such that the created digital assistant performs the action in response to receiving the trigger event. As a result, the applicability and flexibility of a digital assistant can be improved.

20 Claims, 6 Drawing Sheets

CREATING A DIGITAL ASSISTANT

CROSS-REFERENCE

The present application claims priority to Chinese Patent Application No. 202410383220.0, filed on Mar. 29, 2024 and entitled "METHOD, APPARATUS, DEVICE AND MEDIA FOR CREATING A DIGITAL ASSISTANT", the entirety of which is incorporated herein by reference.

FIELD

The exemplary implementations of the present disclosure relate generally to the computer field, and in particular to creating a digital assistant.

BACKGROUND

Machine learning technology has been widely used in various fields. In the prior art, a digital assistant is provided to assist users in various task processing needs in different applications and scenarios. The digital assistant may often invoke a variety of built-in or third-party tools to perform tasks. The digital assistant often has intelligent conversation and task processing capabilities. The digital assistant may be invoked in response to user input. For example, during interaction with a digital assistant, the user enters an interaction message, and the digital assistant provides a reply message in response to the user input. Typically, the digital assistant may provide feedback on a user's input based on that input in real time. However, the user may expect the digital assistant to be automatically invoked upon detection of certain events.

SUMMARY

In a first aspect of the present disclosure, a method for creating a digital assistant is provided. The method includes: presenting a settings region in a creation page of the digital assistant, wherein the settings region is configured to set a trigger of the digital assistant, the trigger specifying an event source for receiving a trigger event and an action corresponding to the trigger event, wherein the trigger event is an event from an application other than the digital assistant; in response to receiving a setting request for the settings region, setting the trigger based on the setting request; and creating the digital assistant based on the trigger such that the created digital assistant performs the action in response to receiving the trigger event.

In a second aspect of the present disclosure, an apparatus for creating a digital assistant is provided. The apparatus includes: a settings region presenting module configured to present a settings region in a creation page of the digital assistant, wherein the settings region is configured to set a trigger of the digital assistant, the trigger specifying an event source for receiving a trigger event and an action corresponding to the trigger event, wherein the trigger event is an event from an application other than the digital assistant; a trigger setting module configured to, in response to receiving a setting request for the settings region, set the trigger based on the setting request; and a digital assistant creating module configured to create the digital assistant based on the trigger such that the created digital assistant performs the action in response to receiving the trigger event.

In the third aspect of this disclosure, an electronic device is provided. The electronic device includes: at least one processing unit; and at least one memory coupled to the at least one processing unit and storing instructions executed by the at least one processing unit, the instructions when executed by the at least one processing unit causes the electronic device to perform a method according to the first aspect of this disclosure.

In a fourth aspect of this disclosure, a computer-readable storage medium having a computer program stored thereon is provided. The computer program when executed by a processor performs operations that implement a method according to the first aspect of this disclosure.

According to the fifth aspect of this disclosure, there is provided a computer program product comprising a computer program, wherein the computer program, when executed by a processor, performs operations that implement the method according to the first aspect of this disclosure.

It should be understood that the content described in this section is not intended to identify key features or important features of implementations of the disclosure, nor is it intended to limit the scope of the disclosure. Other features of the disclosure will become apparent from the description below.

BRIEF DESCRIPTION OF THE DRAWINGS

The above and other features, advantages, and aspects of various embodiments of the present disclosure will become more apparent with reference to the following detailed description taken in conjunction with the accompanying drawings. In the drawings, the same or similar reference numbers represent the same or similar elements, where.

DETAILED DESCRIPTION

Figure 1:
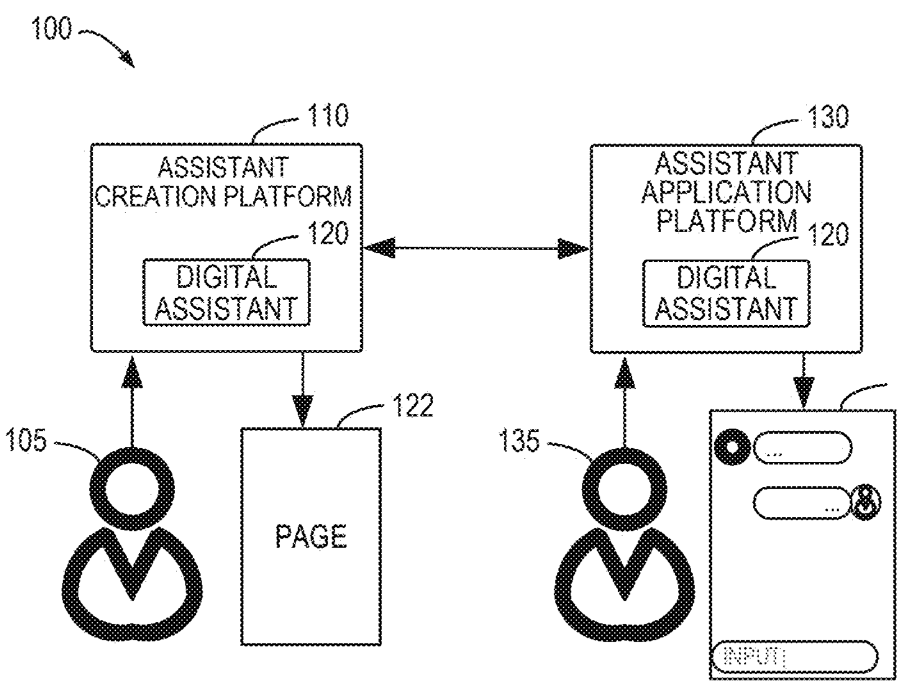
FIG. 1 shows a schematic diagram of an example environment.

The embodiments of the present disclosure will be described in more detail below with reference to the accompanying drawings. Although certain embodiments of the disclosure are shown in the drawings, it should be understood that the disclosure may be embodied in various forms and should not be construed as limited to the embodiments set forth herein, but rather, these embodiments are provided for greater clarity. A thorough and complete understanding of this disclosure. It should be understood that the drawings and embodiments of the present disclosure are for illustrative purposes only and are not intended to limit the scope of the present disclosure.

In the description of embodiments of the present disclosure, the term "including" and similar expressions shall be understood as an open-ended inclusion, that is, "including but not limited to". The term "based on" should be understood to mean "based at least in part on". The term "an embodiment" or "the embodiment" shall be understood to mean "at least one embodiment". The term "some embodiments" should be understood as "at least some embodiments". Other explicit and implicit definitions may be included below.

In this specification, unless explicitly stated, performing a step "in response to A" does not mean that the step is performed immediately after "A" but may include one or more intermediate steps.

It can be understood that the data involved in this technical solution (including but not limited to the data itself, the acquisition, use, storage or deletion of the data) should comply with the requirements of corresponding laws, regulations and relevant regulations.

It can be understood that before using the technical solutions disclosed in each embodiment of this disclosure, relevant users should be informed of the type, scope of use, usage scenarios, etc. of the information involved in this disclosure through appropriate methods in accordance with relevant laws and regulations, and authorization from the relevant users should be obtained, where relevant users can include any type of rights subject, such as individuals, businesses, and groups.

For example, in response to receiving an active request from a user, prompt information is sent to the relevant user to clearly remind the relevant user that the operation requested will require and use the relevant user's information, so that the relevant user can follow the prompt information autonomously chooses whether to provide information to software or hardware such as electronic devices, applications, servers, or storage media that perform operations of the disclosed technical solution.

As an optional but non-limiting embodiment, in response to receiving an active request from a relevant user, a way of sending prompt information to the relevant user, for example, can be in the form of a pop-up window, and the prompt information may be presented in the form of text in the pop-up window. In addition, the pop-up window may also carry a selection control for the user to select "agree" or "disagree" to provide information to the electronic device.

It can be understood that the above notification and user authorization processes are only illustrative and do not limit the embodiments of this disclosure. Other ways that meet relevant laws and regulations can also be applied to the embodiments of this disclosure.

As used in this specification, the term "model" can learn the association relationship between the corresponding input and output from the training data. The corresponding output can be generated for the given input after the training is completed. Model generation can be based on machine learning techniques. Deep learning is a machine learning algorithm that uses multiple layers of processing units to process inputs and provide corresponding outputs. Neural network models are examples of deep learning-based models. Herein, a "model" may also be called a "machine learning model," "learning model," "machine learning network," or "learning network", and these terms are used interchangeably in this description.

Digital assistants can be used as tools for people to effectively work, study, and live. Generally, the development of digital assistants is similar to the development of general applications. Developers with programming capabilities need to write complex codes to define the capabilities of the digital assistant, and deploy the digital assistant on an appropriate operating platform so that users can download, install and use digital assistants.

With the diversification of application scenarios and the increasing availability of machine learning technology, more digital assistants with different capabilities may be developed to support task processing in various segments, or to meet the personalized needs of different users. However, because a given user's programming capabilities and understanding of the underlying implementation logic of digital assistants may be limited, the user cannot create different digital assistants freely and conveniently. A variety of low-code programming platforms are currently available, and users can create digital assistants in a more convenient and flexible way.

The digital assistant is invoked in response to user input, for example, the user can enter an interactive message, and the digital assistant provides a reply message in response to the user input. However, users may expect the digital assistant to be automatically invoked in the event of certain future events. Consequently, this specification describes technologies for providing a more convenient and flexible way to create digital assistants, and enable the digital assistant to be automatically invoked when predetermined events occur, thereby meeting more needs of users.

Example Environment

The application environment of the present disclosure is described with reference to FIG. 1, which shows a schematic diagram of an example environment 100 in which embodiments of the present disclosure may be implemented. Environment 100 involves an assistant creation platform 110 and an assistant application platform 130.

As shown in FIG. 1, the assistant creation platform 110 may provide a user 105 with an environment in which the digital assistant may be created and released. In some embodiments, the assistant creation platform 110 may be a low-code platform that provides a collection of tools for creating digital assistants. The assistant creation platform 110 may support the visual development of digital assistants, thereby allowing developers to skip the manual coding process and speed up the application development cycle and cost. The assistant creation platform 110 may be any suitable platform that supports users in developing digital assistants and other types of applications, and may include, for example, application platform as a service (aPaaS) based platforms. Such a platform may support users to efficiently develop applications and implement operations such as application creation and application function adjustment.

The assistant creation platform 110 may be deployed locally on the user's 105 terminal device, and/or may be supported by a remote server. For example, the terminal device of the user 105 may run a client (e.g., an application) in communication with the assistant creation platform 110, and the client may support the user's interaction with the assistant creation platform 110. When the assistant creation platform 110 runs locally on the user's terminal device, the user 105 may directly interact with the local assistant creation platform 110 using the client. When the assistant creation platform 110 runs on a server device, the server device may provide services to the client running on the terminal device based on the communication connection between the assistant creation platform and the terminal device. The assistant creation platform 110 may present corresponding pages 122 to the user 105 based on the user's 105 operations to output and/or receive information to/from the user 105.

In some embodiments, the assistant creation platform 110 may be associated with a corresponding database that stores data or information required for the digital assistant creation process supported by the assistant creation platform 110. For example, the database may store code and description information corresponding to each functional module that constitutes the digital assistant. The assistant creation platform 110 may also perform operations, such as calling, adding, deleting, and updating, on functional modules in the database. The database may also store operations that can be performed on different functional modules. For example, in a scenario where a digital assistant is to be created, the assistant creation platform 110 may call corresponding function blocks from the database to build the digital assistant.

In some embodiments of the present disclosure, the user 105 may create a digital assistant 120 as needed on the assistant creation platform 110 and release the digital assistant 120. The digital assistant 120 may be released to any suitable assistant application platform 130, as long as the assistant application platform 130 is capable of supporting the operation of the digital assistant 120. After being released, the digital assistant 120 may be used for conversational interaction with user 135. The client of the assistant creation platform 110 may present the interaction window 132 of the digital assistant 120 in the client interface, such as a session window. For example, the client may render a user interface in the terminal device for presenting the interaction window. As an intelligent assistant, the digital assistant 120 has intelligent conversation and information processing capabilities. The user 105 may enter a session message in the session window, and the digital assistant 120 may determine a reply message based on the created configuration information and present it to the user in the interaction window 132. In some embodiments, depending on the configuration of digital assistant 120, interaction messages with digital assistant 120 may include various message formats for multi-modal interaction, such as text messages (e.g., natural language text), voice messages, image messages, video messages, etc.

The assistant creation platform 110 and/or assistant application platform 130 may run on appropriate electronic devices. The electronic device here may be any suitable type of device with computing capabilities, including terminal device or server device. The terminal device may be any type of mobile terminal, fixed terminal or portable terminal, including mobile phone, desktop computer, laptop computers, notebook computer, netbook computer, tablet computer, media computer, multimedia tablet, personal communication system (PCS) device, personal navigation device, personal digital assistant (PDA), audio/video player, digital camera/camcorder, positioning device, television receiver, radio broadcast receiver, e-book device, gaming device, or any combination of the foregoing, including accessories and peripherals for these devices or any combination thereof. The server device may include, for example, a computing system/server such as a mainframe, edge computing node, computing device in cloud environment, and the like. In some embodiments, the assistant creation platform 110 and/or the assistant application platform 130 may be implemented based on cloud service.

It should be understood that the structure and function of environment 100 are described for illustrative purposes only and do not imply any limitation on the scope of the present disclosure.

The assistant creation platform 110 may obtain interaction information between the user 105 and the digital assistant 120 in the session window (including session messages from the user 105 and reply messages from the digital assistant 120). In some embodiments, the assistant creation platform 110 may use models to understand the user's session messages and determine the next action to take. The assistant creation platform 110 may interact with the model to provide model input to the model and obtain corresponding model output from the model. The model may be run locally on the assistant creation platform 110 or on a remote server. In some embodiments, the model may be a machine learning model, a deep learning model, a learning model, a neural network, etc. In some embodiments, the model may be based on language models (LM), especially a large language model (LLM). The language models may have question-answering capabilities by learning from a large amount of corpus. Models may also be based on other suitable models.

As mentioned briefly above, the digital assistant may often provide feedback (e.g., a response) to a user's input based on the user input in real time. That is, the digital assistant relies on real-time interaction with users and cannot handle tasks that need to be performed when specific events occur. For example, a user might want a digital assistant to: in response to a determination that a new email has been received in a specified mailbox, automatically reply with "Received", and so on. However, the existing digital assistants do not support being triggered in response to specific events, which greatly limits the functions and application areas of digital assistants. However, as described below, this specification provides technologies that allow complex tasks triggered by specific events to be handled in a more flexible and effective manner.

Summary of Creating a Digital Assistant

In order to at least partially solve the deficiencies in the prior art, according to an exemplary implementation of the present disclosure, an improved solution for creating a digital assistant is proposed. According to this solution, a settings region is presented in a creation page of the digital assistant. The settings region is configured to set a trigger of the digital assistant. The trigger specifies an event source for receiving a trigger event and an action corresponding to the trigger event. The trigger event can be an event from an application other than the digital assistant. In response to receiving a settings request for the settings region, the trigger is set based on the settings request. The digital assistant is created based on the trigger such that the created digital assistant performs the action in response to receiving the trigger event.

In this way, in embodiments of the present disclosure, a trigger of a digital assistant may be configured, and a digital assistant with trigger function may be created so that the created digital assistant may perform actions in response to trigger events that occur in response to the trigger and not directly in response to a user input to the digital assistant. This improves the applicability and flexibility of the digital assistant and allows it to handle more complex tasks. Various example implementations of this solution are further described in detail below with reference to the accompanying drawings.

Detailed Process for Creating a Digital Assistant

Figure 2:
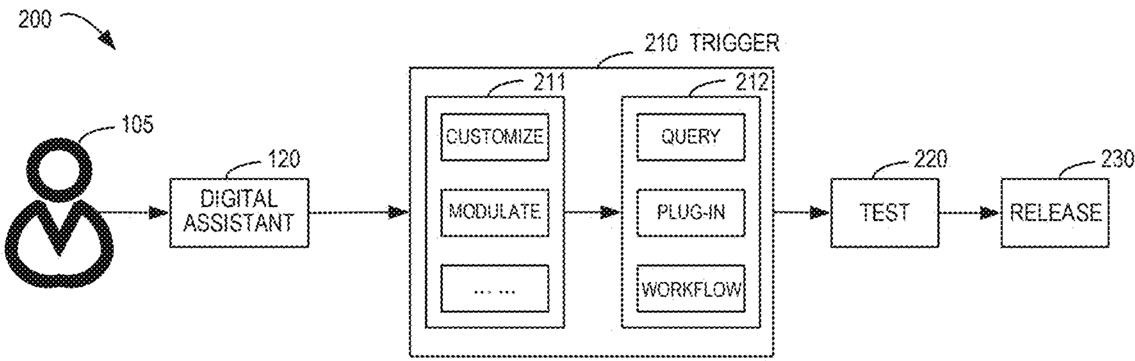
FIG. 2 shows a schematic diagram of an example of creating and applying a digital assistant.
Figure 2:
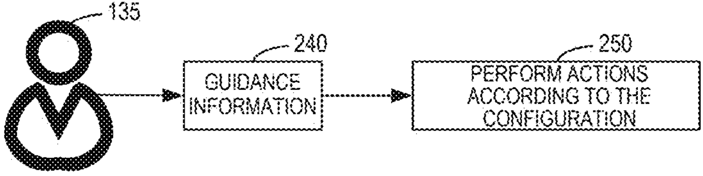

FIG. 2 shows a schematic diagram of an example 200 of creating and applying a digital assistant in accordance with some embodiments of the present disclosure. In embodiments of the present disclosure, as shown in the upper part of FIG. 2, the assistant creation platform 110 presents a settings region in the creation page of the digital assistant (for example, the digital assistant 120), wherein the settings region is used to set the trigger 210 of the digital assistant. The trigger 210 specifies an event source 211 for receiving the trigger event (which may include an event source customized by the user 105 (e.g., webhook notification), an event template provided by the assistant creation platform 110 (e.g., a reference event source, etc.), and so on) and an action 212 corresponding to the trigger event (the type of action may include, for example, query type, plug-in type, workflow type, etc.), wherein the trigger event is an event from an application other than the digital assistant. The assistant creation platform 110 may receive a settings request for the settings region from the user 105 via the settings region.

The lower part of FIG. 2 shows the application process after the digital assistant is released. The assistant application platform 130 may provide the user 135 with guidance information 240 about the digital assistant. The guidance information 240 may, for example, indicate the functions and uses of the digital assistant. In turn, the digital assistant may perform action 250 according to the configuration.

Figure 3:
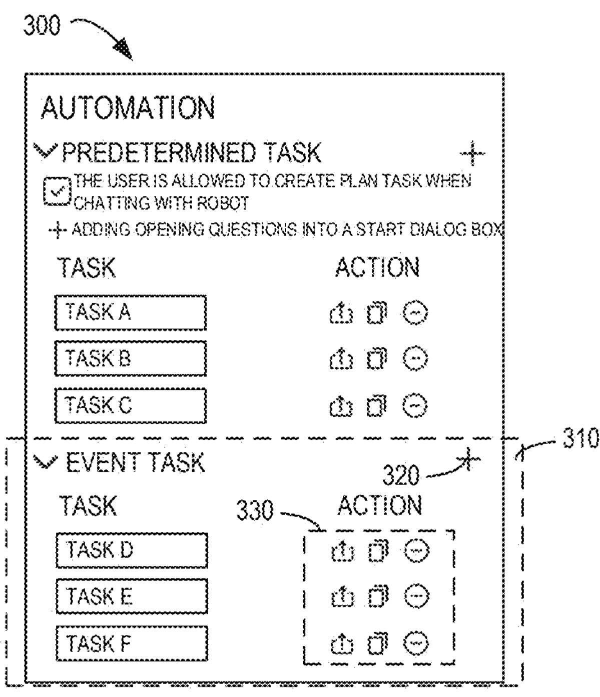
FIG. 3 shows a schematic diagram of an example page.

More details of creating a digital assistant are described with reference to FIG. 3, which shows a schematic diagram of an example page 300 (which may also be simply referred to as example 300) according to some embodiments of the present disclosure. Example 300 includes a region 310 for setting an event task, which is also a settings region for setting a trigger 210. At least one created event task (e.g., tasks D to E shown in the figure) may be presented in the region 310. Each event task may correspond to a trigger event (herein the event task and the trigger event may be used interchangeably), that is, correspond to a trigger. In some embodiments, the number of the at least one event task should be less than or equal to a predetermined number (any appropriate number such as 5, 10, 15, etc.). When the number of at least one created event task reaches a predetermined number and a request to create a new event task is received again, the assistant creation platform 110 may present a prompt message of "create at most XX tasks".

The region 310 includes control 320, and the assistant creation platform 110 may present a creation page for an event task in response to receiving a user operation on control 320. The region 310 includes a sub-region 330 for presenting a plurality of operation controls for each event task. The assistant creation platform 110 may perform corresponding actions in response to receiving a user operation for the target operation control in the sub-region 330, such as sharing a task, copying a task, or deleting a task. In some embodiments, the assistant creation platform 110 may also present an edit page for a certain created event task in response to receiving a selection operation for the event task in the region 310. The assistant creation platform 110 may receive an edit request for an event task from user 105 via this edit page.

The upper part of the page 300 shows a region for setting predetermined tasks. The user may set predetermined tasks A, B, and C that are triggered at a certain point in time. For example, an alarm clock task at 8 a.m. may be specified, or a task of obtaining a weather forecast at 9 a.m. may be specified, and so on.

Figure 4:
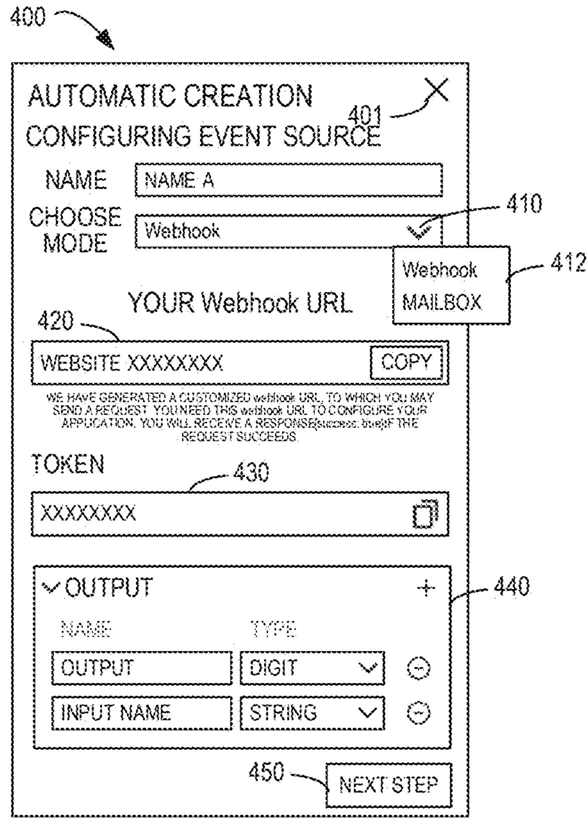
FIG. 4 shows a schematic diagram of an example page.

FIG. 4 shows a schematic diagram of an example page 400 (which may also be simply referred to as the example 400) according to other embodiments of the present disclosure. Example 400 shows, for example, a creation page of an event task, and/or an edit page of an event task. Example 400 includes a cancel control 401, and the assistant creation platform 110 may cancel presentation example 400 in response to receiving a user operation on cancel control 401 (the assistant creation platform 110 may, for example, return presentation example 300).

Example 400 also includes a selection control 410 for setting the type of event task. The type of event task (that is, the type of trigger event) may include, for example, an instant message type and/or an application event type. Here, the instant message type may represent, for example, a way of real-time transmission of information between applications, such as a "Webhook" way. The assistant creation platform 110 may present window 412 in response to receiving a user operation on selection control 410. The window 412 may present options respectively corresponding to the instant message type and the application event type. For example, the option "Webhook" may correspond to the instant message type, and the option "Mailbox" may correspond to the application event type. It should be understood that a "Mailbox" is only a specific example of an application corresponding to an application event type, alternatively and/or additionally, events from other applications may be received. For example, new messages from an instant messaging app may be received, new notifications from a shopping app may be received, and so on.

If the option "Webhook" is selected, the assistant creation platform 110 may determine that the type of the trigger event is an instant message type and present an input box 420 through which the assistant creation platform 110 may receive configuration for the trigger event (e.g., event source). In some embodiments, the assistant creation platform 110 may generate trigger events based on the digital assistant and message data from event sources.

For example, the assistant creation platform 110 may generate a Webhook URL based on the identification of the digital assistant (e.g., the ID of the digital assistant) and the message data from the event source. Alternatively or additionally, the assistant creation platform 110 may also generate a Webhook URL based on the identification of the user 105 (e.g., the user ID of the user 105), the identification of the digital assistant (e.g., the ID of the digital assistant), and the message data from the event source. This ensures the uniqueness of the Webhook URL and avoids confusion. The assistant creation platform 110 may also present an input box 430. The assistant creation platform 110 may receive authentication information (which may also be understood as a password) for receiving message data via the event source via the input box 430. Furthermore, the created digital assistant may receive message data if the authentication information matches the event source.

If the option "Mailbox" is selected, the assistant creation platform 110 may determine that the type of the trigger event is an application event type. For example, the assistant creation platform 110 may present an input box for receiving authentication information. The assistant creation platform may receive authentication information for logging in to the application via the input box. The digital assistant may use authentication information to log in to the application to receive message data and generate trigger events based on the message data. For example, the user may set a token in the assistant creation platform so that the digital assistant may use the token to obtain corresponding notification messages.

In some embodiments, the assistant creation platform 110 may also specify the validity period of the authentication information. For example, the assistant creation platform 110 may specify that the validity period of the authentication information is 30 days (or other length of time). After the digital assistant is released, a trigger event may be acquired by the digital assistant in response to determining that the use of the authentication information meets the validity period (for example, in response to the interval between the current date and the last date of acquiring the authentication information not exceeding 30 days). A user of the digital assistant application (e.g., user 135) may be presented with a input control for inputting authentication information in response to a determination that the use of the authentication information does not satisfy the validity period (e.g., in response to the interval between the current date and the last date of acquired the authentication information reaching 30 day), and use the authentication information received through the input control to log in to the application in order to obtain the trigger event.

Continuing with the example of the option "Webhook", the assistant creation platform 110 may also present a region 440. The assistant creation platform 110 may receive configuration information via region 440 for the format of message data from the event source. For example, the assistant creation platform 110 may receive a JSON format followed by message data via region 440, then the subsequent actions may be executed by the trigger event based on the formatted message. In some embodiments, the example 400 further includes a control 450, and the assistant creation platform 110 may present a configuration page for the action in response to the control 450 being triggered. Types of actions may include, for example, query type, plug-in type, and workflow type. The assistant creation platform 110 may receive a settings request for an action from the user 105 via the configuration page of the action. The assistant creation platform 110 may determine the type of action based on the settings request, and set an action matching the type of action based on the settings request.

Figure 5A:
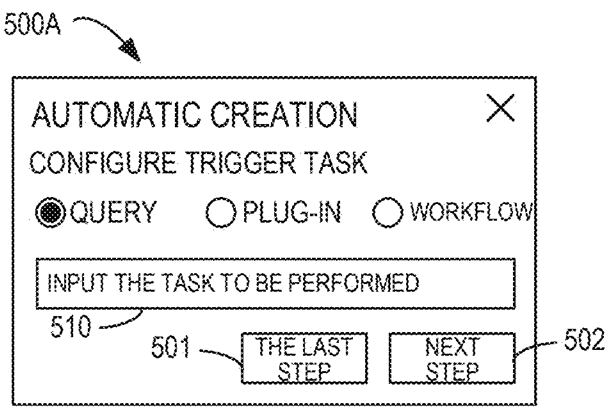
FIGS. 5A to 5C illustrate schematic diagrams of example configuration pages for actions.
Figure 5B:
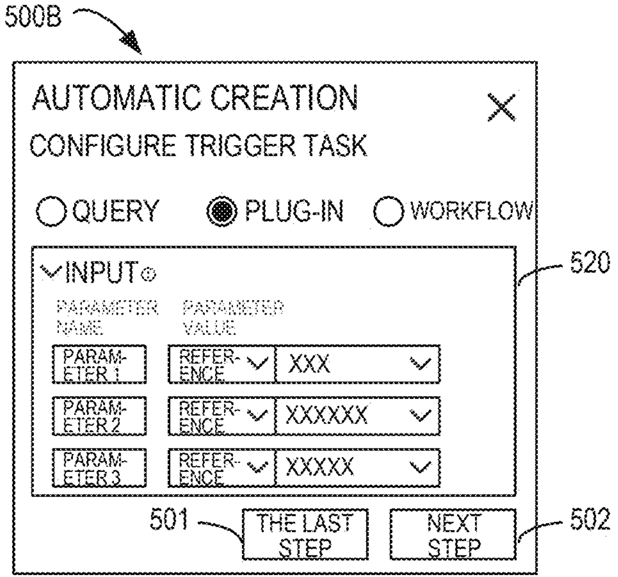
Figure 5C:
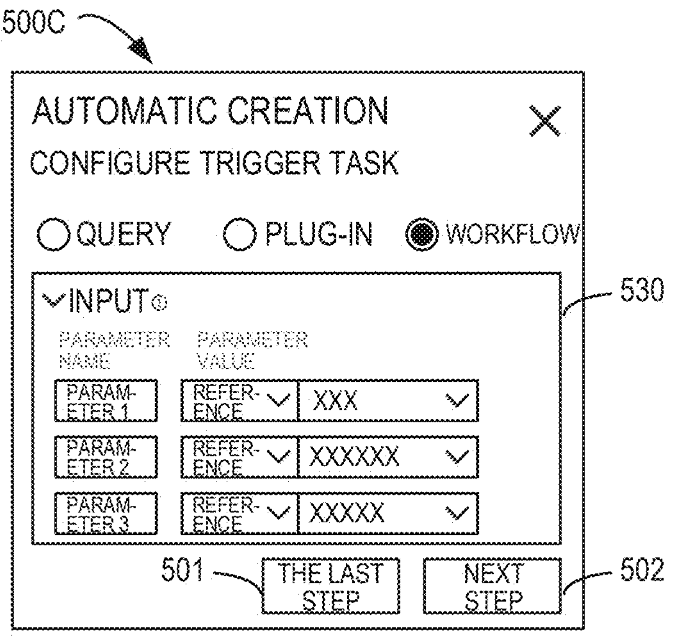

For example, the assistant creation platform 110 may present examples 500A to 500C shown in FIGS. 5A to 5C in response to receiving a user operation on control 450. FIGS. 5A to 5C illustrate schematic diagrams of example configuration pages (i.e., examples 500A to 500C) of actions according to some embodiments of the present disclosure. The configuration page includes three options, corresponding to query type, plug-in type and workflow type respectively. If the type of action indicates a query type, the assistant creation platform 110 may present example 500A. In example 500A, the option "query" is selected. For example, the query type may represent an action performed by invoking the query function of the digital assistant, that is, a prompt is generated based on the received message data, thereby causing the digital assistant to output a reply to the prompt.

Example 500A includes an input box 510. The assistant creation platform 110 may receive settings for the prompt template via the input box 510. In the case where it is determined that the type of action indicates the query type, the message data may be extracted from the trigger event, and the query prompt may be generated based on the message data and the prompt template (i.e., the prompt template received via the input box 510), such that the created digital assistant performs corresponding actions based on the query prompts. The prompt may be, for example, a model input used to interact with a model (such as a language model), which is used to guide the model to provide corresponding model output based on learned knowledge.

If the type of action indicates a plug-in type, the assistant creation platform 110 may present example 500B. In example 500B, the option "plug-in" is selected. Example 500B includes a region 520. The assistant creation platform 110 may receive a settings request from user 105 via region 520, and select a plug-in integrated into the digital assistant based on the received settings request. When it is determined that the type of action indicates the plug-in type, the message data may be extracted from the trigger event, so that the created digital assistant invokes the plug-in to perform the corresponding action based on the message data.

It should be understood that the plug-ins here are various plug-ins that may be integrated into the digital assistant. For example, a search plug-in may be provided by a search application and/or a search web page, and may be invoked to perform search tasks specified by the message data. For another example, the ticket booking plug-in may be provided by a ticket booking application and/or a ticket booking web page, and may be invoked to perform a ticket booking task specified by the message data, and so on.

If the type of action indicates a workflow type, the assistant creation platform 110 may present example 500C. In example 500C, the option "workflow" is selected. Example 500C includes a region 530. The assistant creation platform 110 may receive a setting request from the user 105 via region 530, and select a workflow integrated into the digital assistant based on the received setting request (which may include a customized workflow, such as a workflow according to automatic reply email).

It should be understood that the workflow here refers to a sequence including a plurality of predetermined nodes that will be integrated into the digital assistant. The user may customize the specific configuration of each node in the workflow and the data flow relationship between each node to complete more complex tasks. In the case where it is determined that the type of action indicates the workflow type, the message data may be extracted from the trigger event, so that the created digital assistant invokes the workflow to perform the corresponding action based on the message data.

Figure 6:
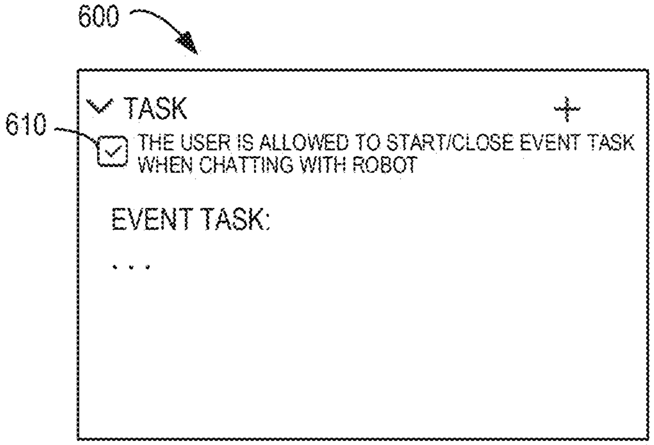
FIG. 6 shows a schematic diagram of an example creation page of predetermined tasks.

In some embodiments, the assistant creation platform 110 may also be set in response to the action type, representing example 600 as shown in FIG. 6. Example 600 includes a control 610. The assistant creation platform 110 may create an event task (i.e., create a trigger) based on the above setting request in response to receiving a user operation for the creation control 610.

Assuming that control 610 is set, the end user (i.e., user 135) is allowed to start/close event tasks in the conversational page. For example, if user 135 wants to close the event task "AAA" (performing the automatic reply email task), he/she may enter "Please close the event task AAA" in the conversational page. At this time, the automatic reply mail task will be closed, and no automatic reply will be provided for new incoming mail. The user 135 may enter "Please start event task AAA" in the conversational page, and the automatic reply email task will be started at this time. Assuming that control 610 is not set, the end user is not allowed to start/close event tasks in the conversational page.

In some embodiments, the assistant creation platform 110 may store triggers in response to receiving user interaction. If the trigger is shared with other users, other users may also load the trigger in another creation page of another digital assistant. Another digital assistant may be created based on a trigger such that the created another digital assistant performs an action in response to detecting a trigger event. As a result, triggers may be shared. A trigger created by one user may be shared with other users. That is, a trigger may be shared by multiple digital assistants, which can improve the applicability and flexibility of the trigger.

Returning to FIG. 2, after the trigger is created, the assistant creation platform 110 may further perform a test 220 on the digital assistant in response to receiving a testing request for testing the digital assistant. After passing the test, the user 105 may release 230 the digital assistant. To perform the test, the assistant creation platform 110 may obtain a trigger event used to simulate that it is from event source (for example, suppose a Webhook-URL is received, or an email is received). The assistant creation platform 110 may provide execution results of actions performed by the digital assistant (for example, including normal execution and exceptions). The execution results may be provided, for example, in a conversational page of the digital assistant. In some embodiments, in order to avoid frequently receiving execution results corresponding to different trigger events, the assistant creation platform 110 may also switch the working state of triggers in response to receiving a switching request in a conversational page. For example, the assistant creation platform 110 may switch the XX trigger from an enabled state to a disabled state in response to receiving the session "turn off XX trigger" in the conversational page.

After the digital assistant is created, the created digital assistant may detect the trigger event, and in response to detecting the trigger event, the created digital assistant may perform actions corresponding to the trigger event based on its own configuration. The creation may include multiple forms, for example, a digital assistant may be created during the testing phase, the digital assistant may be used by user 105 in assistant creation platform 110. For another example, after the digital assistant that invokes the trigger is tested, it may be released to the assistant application platform 130. At this point, the created digital assistant may be used by more users (e.g., multiple users 135).

After the digital assistant is released, the assistant application platform 130 may provide guidance information about the digital assistant to the user 135, and the guidance information may be used, for example, to indicate the functions and uses of the digital assistant. Specifically, assuming that the digital assistant includes a trigger to perform an automatic reply email task, the digital assistant may log in to the email server using specified authentication information (e.g., email account and password). If a new email is received in that email account, the new email may be automatically replied, and so on.

In summary, according to the embodiments of the present disclosure, a trigger of the digital assistant may be configured. The digital assistant may perform actions based on trigger events, thereby supporting the digital assistant to perform corresponding actions based on events from other applications. This helps improve the applicability and flexibility of digital assistants, and allows digital assistants to collaborate with other applications to perform more complex tasks.

Example Process

Figure 7:
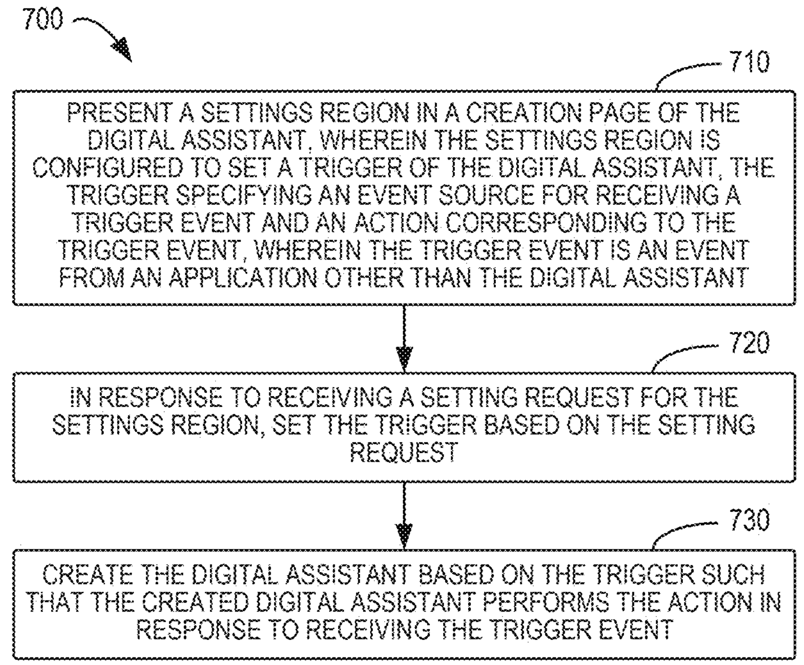
FIG. 7 illustrates a flowchart of an example process for creating a digital assistant.

FIG. 7 illustrates a flow diagram of an example process 700 for creating a digital assistant in accordance with some embodiments of the present disclosure. Process 700 may be implemented at assistant creation platform 110. The process 700 is described below with reference to FIG. 1.

As shown in FIG. 7, at block 710, a settings region is presented in the creation page of the digital assistant. The settings region is configured to set a trigger of the digital assistant, where the trigger specifies an event source for receiving a trigger event and an action corresponding to the trigger event. In some embodiments, the trigger event is an event from an application other than the digital assistant. At block 720, in response to receiving a setting request for the settings region, the trigger is set based on the setting request. At block 730, the digital assistant is created based on the trigger such that the created digital assistant performs the action in response to receiving the trigger event.

In some embodiments, the type of the trigger event includes an instant message type, and setting the trigger based on the setting request includes: generating the trigger event based on the digital assistant and message data from the event source.

In some embodiments, generating the trigger event further includes: setting authentication information for receiving the message data via the event source.

In some embodiments, the type of the trigger event includes an application event type, and setting the trigger based on the setting request includes: setting authentication information for logging in to the application; wherein the authentication information is used for logging in to the application to receive message data for generating the trigger event.

In some embodiments, setting the authentication information further includes: specifying a validity period of the authentication information.

In some embodiments, setting the trigger based on the setting request includes: determining the type of the action based on the settings request; and setting an action matching the type of the action based on the setting request.

In some embodiments, the process 700 further includes: in response to determining that the type of the action indicates a query type, extracting message data from the trigger event; and generating a query prompt based on the message data and a prompt template, so that the created digital assistant performs the action based on the query prompt.

In some embodiments, the process 700 further includes: in response to determining that the type of action indicates a plug-in type, selecting a plug-in integrated by the digital assistant based on the setting request; and extracting message data from the trigger event, so that the created digital assistant invokes the plug-in to perform the action based on the message data.

In some embodiments, the process 700 further includes: in response to determining that the type of the action indicates a workflow type, selecting a workflow integrated by the digital assistant based on the settings request; and extracting message data from the trigger event, so that the created digital assistant invokes the workflow to perform the action based on the message data.

In some embodiments, the process 700 further includes: in response to receiving a testing request for testing the digital assistant, acquiring the trigger event used to simulate that it is from event source; and providing an execution result of the digital assistant executing the action.

In some embodiments, the digital assistant provides the execution result in a conversational page, and the process 700 further includes: in response to receiving a switching request in the conversational page, switching the working state of the trigger.

In some embodiments, the process 700 further includes: detecting the trigger event by the created digital assistant; and in response to detecting the trigger event, executing the action by the created digital assistant.

In some embodiments, detecting the trigger event includes at least one of the following: in response to determining that use of the authentication information satisfies the validity period, obtaining the trigger event by the digital assistant; and in response to determining that the use of the authentication information does not satisfy the validity period, presenting an input control for inputting the authentication information; and logging in to the application using the authentication information received via the input control to obtain the trigger event.

In some embodiments, the process 700 further includes: in response to receiving user interaction, storing the trigger; loading the trigger in another creation page of another digital assistant; and creating another digital assistant based on the trigger such that the created another digital assistant performs the action in response to detecting the trigger event.

Example Apparatus and Device

Figure 8:
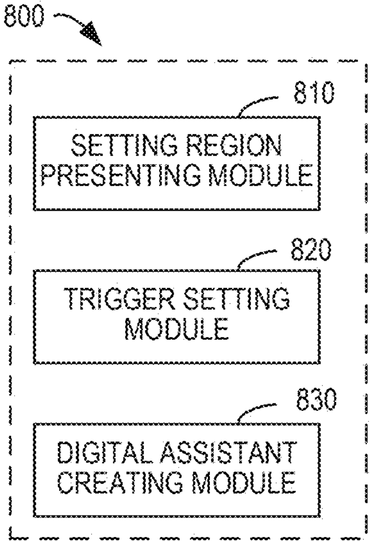
FIG. 8 shows a schematic structural block diagram of an example apparatus for creating a digital assistant.

The embodiments of the present disclosure also provide corresponding apparatus for implementing the above methods or processes. FIG. 8 shows a structural schematic block diagram of an example apparatus 800 for creating digital assistants according to some embodiments of the present disclosure. The apparatus 1000 may be included, for example, in assistant creation platform 110 in FIG. 1. Each module/component in the apparatus 800 may be implemented by hardware, software, firmware, or any combination thereof.

As shown in the figures, the apparatus 800 comprises a settings region presenting module 810 configured for presenting a settings region in a creation page of the digital assistant, wherein the settings region is configured to set a trigger of the digital assistant, where the trigger specifies an event source for receiving a trigger event and an action corresponding to the trigger event, and the trigger event is an event from an application other than the digital assistant. The apparatus 800 further comprises a trigger setting module 820 configured for, in response to receiving a settings request for the settings region, setting the trigger based on the setting request. The apparatus 800 further comprises a digital assistant releasing module 830 configured for creating the digital assistant based on the trigger such that the created digital assistant performs the action in response to receiving the trigger event.

In some embodiments, the type of the trigger event includes an instant message type, and the trigger setting module is further configured for: generating the trigger event based on the digital assistant and message data from the event source.

In some embodiments, the trigger setting module is further configured for: setting authentication information for receiving the message data via the event source.

In some embodiments, the type of the trigger event includes an application event type, and the trigger setting module is further configured for: setting authentication information for logging in to the application; wherein the authentication information is used for logging in to the application to receive message data for generating the trigger event.

In some embodiments, the trigger setting module is further configured for: specifying a validity period of the authentication information.

In some embodiments, the trigger setting module is further configured for: determining the type of the action based on the settings request; and setting an action matching the type of the action based on the setting request.

In some embodiments, the apparatus further includes: extracting module configured for, in response to determining that the type of the action indicates a query type, extracting message data from the trigger event; and a generating module configured for generating a query prompt based on the message data and a prompt template, so that the created digital assistant performs the action based on the query prompt.

In some embodiments, the apparatus further includes: a plug-in selecting module configured for, in response to determining that the type of action indicates a plug-in type, selecting a plug-in integrated by the digital assistant based on the setting request; and a plug-in invoking module configured for extracting message data from the trigger event, so that the created digital assistant invokes the plug-in to perform the action based on the message data.

In some embodiments, the apparatus further includes: a workflow selecting module configured for, in response to determining that the type of the action indicates a workflow type, selecting a workflow integrated by the digital assistant based on the settings request; and a workflow invoking module configured for, extracting message data from the trigger event, so that the created digital assistant invokes the workflow to perform the action based on the message data.

In some embodiments, the apparatus further includes: a acquiring module configured for, in response to receiving a testing request for testing the digital assistant, acquiring the trigger event used to simulate that it is from event source; and a providing module configured for providing an execution result of the digital assistant executing the action.

In some embodiments, the digital assistant provides the execution result in a conversational page, and the apparatus further includes a switching module configured for, in response to receiving a switching request in the conversational page, switching the working state of the trigger.

In some embodiments, the apparatus further includes: a detecting module configured for detecting the trigger event by the created digital assistant; and a executing module configured for, in response to detecting the trigger event, executing the action by the created digital assistant.

In some embodiments, the detecting module is further configured for, in response to determining that use of the authentication information satisfies the validity period, obtaining the trigger event by the digital assistant.

In some embodiment, the detecting module is further configured for, in response to determining that the use of the authentication information does not satisfy the validity period, presenting an input control for inputting the authentication information; and logging in to the application using the authentication information received via the input control to obtain the trigger event.

In some embodiments, the apparatus further includes: a storing module configured for, in response to receiving user interaction, storing the trigger; a loading module configured for loading the trigger in another creation page of another digital assistant; and a creating module configured for creating another digital assistant based on the trigger such that the created another digital assistant performs the action in response to detecting the trigger event.

The units and/or modules included in the apparatus 800 may be implemented in various ways, including software, hardware, firmware, or any combination thereof. In some embodiments, one or more units and/or modules may be implemented using software and/or firmware, such as machine-executable instructions stored on a storage medium. In addition to or as an alternative to machine-executable instructions, part or all of the units and/or modules in apparatus 800 may be implemented, at least in part, by one or more hardware logic components. By way of example, and not limitation, exemplary types of hardware logic components that may be used include field programmable gate arrays (FPGAs), application specific integrated circuits (ASICs), application specific standard products (ASSPs), systems on chip (SOCs), complex programmable logic devices (CPLDs), etc.

It should be understood that one or more steps in the above method may be performed by an appropriate electronic device or combination of electronic devices. Such an electronic device or combination of electronic devices may include, for example, the assistant creation platform 110 and/or the assistant application platform 130 in FIG. 1.

Figure 9:
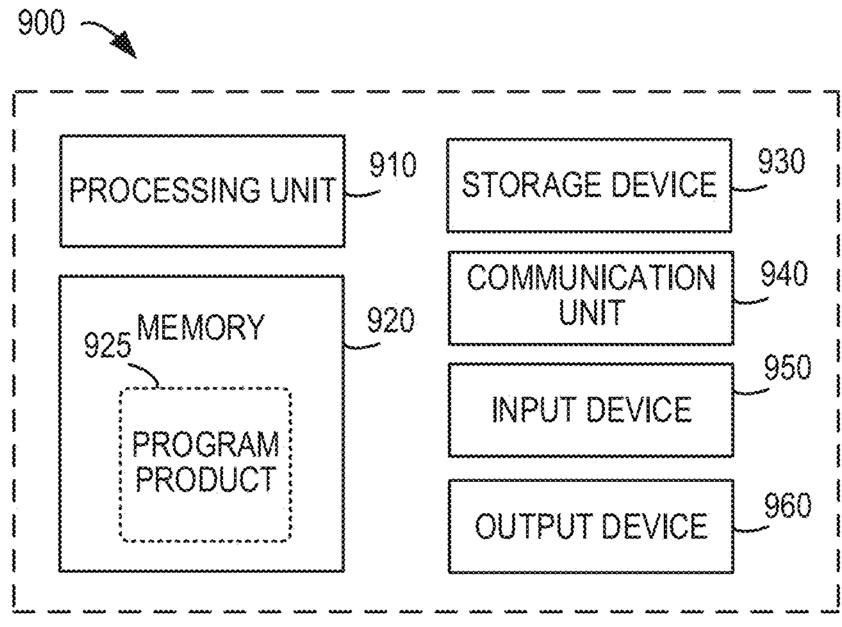
FIG. 9 shows a block diagram of an example electronic device in which one or more embodiments of the present disclosure may be implemented.

FIG. 9 shows a block diagram of an example electronic device 900 in which one or more embodiments of the present disclosure may be implemented. It should be understood that the electronic device 900 shown in FIG. 9 is merely exemplary and should not constitute any limitation on the functionality and scope of the embodiments described herein. The electronic device 900 shown in FIG. 9 can be used to implement the assistant creation platform 110, the assistant application platform 130 of FIG. 1, and/or the apparatus 800 of FIG. 8.

As shown in FIG. 9, the electronic device 900 is in the form of a general-purpose electronic device. The components of electronic device 900 may include, but are not limited to, one or more processors or processing units 910, memory 920, storage device 930, one or more communication units 940, one or more input devices 950, and one or more output devices 960. The processing unit 910 may be a real or virtual processor and can perform various processes according to a program stored in the memory 920. In a multi-processor system, the multiple processing units execute computer-executable instructions in parallel to improve the parallel processing capability of the electronic device 900.

The electronic device 900 typically includes a plurality of computer storage media. Such media may be any available media that is accessible to electronic device 900, including but not limited to volatile and nonvolatile media, removable and non-removable media. The memory 920 may be a volatile memory (e.g., registers, cache, random access memory (RAM)), a nonvolatile memory (e.g., read only memory (ROM), electrically erasable programmable read only memory (EEPROM), flash memory) or some combination thereof. The storage device 930 may be a removable or non-removable medium and may include machine-readable media such as a flash drive, a magnetic disk, or any other medium that may be capable of storing information and/or data and may be accessible in electronic device 900.

The electronic device 900 may further comprise additional removable/non-removable, volatile/non-volatile storage media. Although not shown in FIG. 9, a disk drive may be provided for reading from or writing to a removable, non-volatile disk (e.g., a "floppy disk") and optical disk drive may be provided for reading from or writing to a removable, non-volatile optical disk. In these cases, each drive may be connected to the bus (not shown) by one or more data media interfaces. The memory 920 may include a computer program product 925 having one or more program modules configured to perform various methods or actions of various embodiments of the present disclosure.

The communication unit 940 communicates with other electronic devices through communication media. Additionally, the functionality of the components of electronic device 900 may be implemented with a single computing cluster or multiple computing machines capable of communicating over a communications connection. Accordingly, the electronic device 900 may operate in a networked environment using a logical connection to one or more other servers, a network personal computer (PC), or another network node.

The input device 950 may be one or more input devices, such as a mouse, keyboard, trackball, etc. The output device 960 may be one or more output devices, such as a display, speakers, printer, etc. The electronic device 900 may also communicate with one or more external devices (not shown), such as storage devices, display devices, etc., through the communication unit 940 as needed, and with one or more devices that enable the user to interact with the electronic device 900, or with any device (e.g., network card, modem, etc.) that enables electronic device 900 to communicate with one or more other electronic devices. Such communication may be performed via an input/output (I/O) interface (not shown).

According to an exemplary implementation of the present disclosure, there is provided a computer-readable storage medium having a computer executable instruction stored thereon, wherein the computer executable instruction is executed by a processor to implement the above method. According to an exemplary implementation of the present disclosure, there is provided a computer program product, the computer program product is tangibly stored on a non-transitory computer-readable medium and includes computer-executable instructions, and the computer-executable instructions are executed by a processor to implement the method described above.

Aspects of the present disclosure are described herein with reference to flowchart illustrations and/or block diagrams of methods, apparatus, devices and computer program products implemented in accordance with the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processing unit of a general-purpose computer, a special-purpose computer, or other programmable data processing apparatus, thereby producing a machine such that, when the instructions executed by the processing unit of the computer or other programmable data processing apparatus, an apparatus that implements the functions/actions specified in one or more blocks of the flowcharts and/or block diagrams is produced. These computer-readable program instructions may also be stored in a computer-readable storage medium. These instructions cause the computer, programmable data processing apparatus and/or other devices to work in a specific manner. Therefore, the computer-readable medium storing the instructions includes an article of manufacture that includes instructions that implement aspects of the functions/acts specified in one or more blocks of the flowcharts and/or block diagrams.

The computer-readable program instructions may be loaded onto a computer, other programmable data processing apparatus, or other device, causing a series of operating steps to be performed on the computer, other programmable data processing apparatus, or other devices to produce a computer-implemented process, thereby, instructions executed on a computer, other programmable data processing apparatus, or other device implement the functions/actions specified in one or more blocks of the flowcharts and/or block diagrams.

The flowcharts and block diagrams in the figures illustrate the architecture, functionality, and operation of possible implementations of systems, methods, and computer program products according to various implementations of the present disclosure. In this regard, each block in the flowchart or block diagrams may represent a module, program segment, or portion of instructions that contains one or more executable functions for implementing the specified logical functions instruction. In some alternative implementations, the functions noted in the blocks may occur out of the order noted in the figures. For example, two consecutive blocks may actually execute substantially in parallel, or they may sometimes execute in the reverse order, depending on the functionality involved. It will also be noted that each block of the block diagram and/or flowchart illustration, and combinations of blocks in the block diagram and/or flowchart illustration, may be implemented by special purpose hardware-based systems that perform the specified functions or acts or can be implemented using a combination of specialized hardware and computer instructions.

Implementations of the present disclosure have been described above. The above description is illustrative, not exhaustive, and is not limited to the disclosed implementations. Many modifications and variations will be apparent to those skilled in the art without departing from the scope and spirit of the described implementations. The terminology used in this description is chosen to best explain the principles, practical applications, or improvements to technology in the market, or to enable other persons of ordinary skill in this field to understand the various implementations disclosed in this description.

The invention claimed is:

1. A method for creating a digital assistant, including:

presenting a settings region in a creation page of the digital assistant, wherein the settings region is configured to set a trigger of the digital assistant, the trigger specifying an event source for receiving a trigger event and an action corresponding to the trigger event, wherein the trigger event is an event from an application other than the digital assistant;

in response to receiving a setting request for the settings region, setting the trigger based on the setting request; and creating the digital assistant based on the trigger such that the created digital assistant performs the action in response to receiving the trigger event.

2. The method of claim 1, wherein a type of the trigger event includes an instant message type, and setting the trigger based on the setting request includes: setting the trigger to generate the trigger event based on the digital assistant and message data from the event source.

3. The method of claim 2, wherein generating the trigger event further includes: setting authentication information for receiving the message data via the event source.

4. The method of claim 1, wherein a type of the trigger event includes an application event type, and setting the trigger based on the setting request includes:

setting authentication information for logging in to the application;

wherein the authentication information is used for logging in to the application to receive message data for generating the trigger event.

5. The method of claim 4, wherein setting the authentication information further includes: specifying a validity period of the authentication information.

6. The method of claim 1, wherein setting the trigger based on the setting request includes:

determining a type of the action based on the settings request; and setting an action matching the type of the action based on the setting request.

7. The method of claim 6, further including:

in response to determining that the type of the action indicates a query type, extracting message data from the trigger event; and generating a query prompt based on the message data and a prompt template, so that the created digital assistant performs the action based on the query prompt.

8. The method of claim 6, further including:

in response to determining that the type of the action indicates a plug-in type, selecting a plug-in integrated by the digital assistant based on the setting request; and extracting message data from the trigger event, so that the created digital assistant invokes the plug-in to perform the action based on the message data.

9. The method of claim 6, further including:

in response to determining that the type of the action indicates a workflow type, selecting a workflow integrated by the digital assistant based on the settings request; and extracting message data from the trigger event, so that the created digital assistant invokes the workflow to perform the action based on the message data.

10. The method of claim 1, further including:

in response to receiving a testing request for testing the digital assistant, acquiring the trigger event used to simulate that it is from the event source; and providing an execution result of the digital assistant executing the action.

11. The method of claim 10, wherein the digital assistant provides the execution result in a conversational page, and the method further includes: in response to receiving a switching request in the conversational page, switching a working state of the trigger.

12. The method of claim 5, further including:

detecting the trigger event by the created digital assistant; and in response to detecting the trigger event, executing the action by the created digital assistant.

13. The method of claim 12, wherein detecting the trigger event includes at least one of the following:

in response to determining that use of the authentication information satisfies the validity period, obtaining the trigger event by the digital assistant;

in response to determining that the use of the authentication information does not satisfy the validity period, presenting an input control for inputting the authentication information; or logging in to the application using the authentication information received via the input control to obtain the trigger event.

14. The method of claim 1, further comprising:

in response to receiving user interaction, storing the trigger;

loading the trigger in a second creation page of a second digital assistant; and creating the second digital assistant based on the trigger such that the second digital assistant performs the action in response to detecting the trigger event.

15. An electronic device including:

at least one processing unit; and at least one memory coupled to the at least one processing unit and storing instructions executed by the at least one processing unit, the instructions when executed by the at least one processing unit causes the electronic device to perform operations comprising:

presenting a settings region in a creation page of a digital assistant, wherein the settings region is configured to set a trigger of the digital assistant, the trigger specifying an event source for receiving a trigger event and an action corresponding to the trigger event, wherein the trigger event is an event from an application other than the digital assistant;

in response to receiving a setting request for the settings region, setting the trigger based on the setting request; and creating the digital assistant based on the trigger such that the created digital assistant performs the action in response to receiving the trigger event.

16. The electronic device of claim 15, wherein a type of the trigger event includes an instant message type, and setting the trigger based on the setting request includes: setting the trigger to generate the trigger event based on the digital assistant and message data from the event source.

17. The electronic device of claim 16, wherein generating the trigger event further includes: setting authentication information for receiving the message data via the event source.

18. The electronic device of claim 15, wherein a type of the trigger event includes an application event type, and setting the trigger based on the setting request includes:

setting authentication information for logging in to the application;

wherein the authentication information is used for logging in to the application for generating the trigger event to receive message data for generating the trigger event.

19. The electronic device of claim 18, wherein setting the authentication information further includes: specifying a validity period of the authentication information.

20. A non-transitory computer-readable storage medium having a computer program stored thereon, the computer program being executed by at least one processor to cause the at least one processor to perform operations comprising:

presenting a settings region in a creation page of a digital assistant, wherein the settings region is configured to set a trigger of the digital assistant, the trigger specifying an event source for receiving a trigger event and an action corresponding to the trigger event, wherein the trigger event is an event from an application other than the digital assistant;

in response to receiving a setting request for the settings region, setting the trigger based on the setting request; and creating the digital assistant based on the trigger such that the created digital assistant performs the action in response to receiving the trigger event.

* * * * *